(12) United States Patent
Beaujot

(10) Patent No.: US 6,997,098 B2
(45) Date of Patent: Feb. 14, 2006

(54) METHOD AND APPARATUS FOR DRIVING HYDRAULIC MOTORS WITH AGRICULTURAL TRACTORS

(75) Inventor: Norbert Beaujot, Regina (CA)

(73) Assignee: Straw Track Manufacturing Inc., Regina (CA)

( * ) Notice: Subject to any disclaimer, the term of this patent is extended or adjusted under 35 U.S.C. 154(b) by 140 days.

(21) Appl. No.: 10/771,399

(22) Filed: Feb. 5, 2004

(65) Prior Publication Data
US 2005/0091973 A1  May 5, 2005

(30) Foreign Application Priority Data
Nov. 5, 2003  (CA) .................................. 2448428

(51) Int. Cl.
F15B 11/08 (2006.01)
(52) U.S. Cl. ................. 91/6; 91/432; 60/428
(58) Field of Classification Search .............. 91/6, 91/432; 60/413, 421, 428, 429, 430
See application file for complete search history.

(56) References Cited

U.S. PATENT DOCUMENTS

| | | | | |
|---|---|---|---|---|
| 3,680,723 A | * | 8/1972 | Seaberg | 91/6 |
| 4,046,399 A | * | 9/1977 | Zeuner et al. | 64/468 |
| 4,455,124 A | * | 6/1984 | Born et al. | 60/429 |
| 4,691,802 A | * | 9/1987 | Ishimori et al. | 60/490 |
| 4,709,736 A | * | 12/1987 | Bellars | 64/468 |
| 5,332,053 A | * | 7/1994 | Vachon | 60/428 |
| 6,537,039 B2 | * | 3/2003 | Mann | 91/432 |
| 6,837,319 B2 | * | 1/2005 | Dvorak et al. | 60/468 |

* cited by examiner

Primary Examiner—Edward K. Look
Assistant Examiner—Michael Leslie
(74) Attorney, Agent, or Firm—Nixon & Vanderhye P.C.

(57) ABSTRACT

For connection to a hydraulic power supply of a tractor, wherein the tractor comprises a plurality of hydraulic supply circuits, and wherein each hydraulic supply circuit comprises a pair of quick couplers for connecting the hydraulic supply circuit to a hydraulic device, a hydraulic motor apparatus comprises a first pair of hydraulic lines adapted for connection to the quick couplers of a first hydraulic supply circuit; a second pair of hydraulic lines adapted for connection to the quick couplers of a second hydraulic supply circuit; and a hydraulic motor connected to both the first and second pairs of hydraulic lines such that fluid can flow from both the first and second hydraulic supply circuits through the hydraulic motor to drive the hydraulic motor.

23 Claims, 2 Drawing Sheets

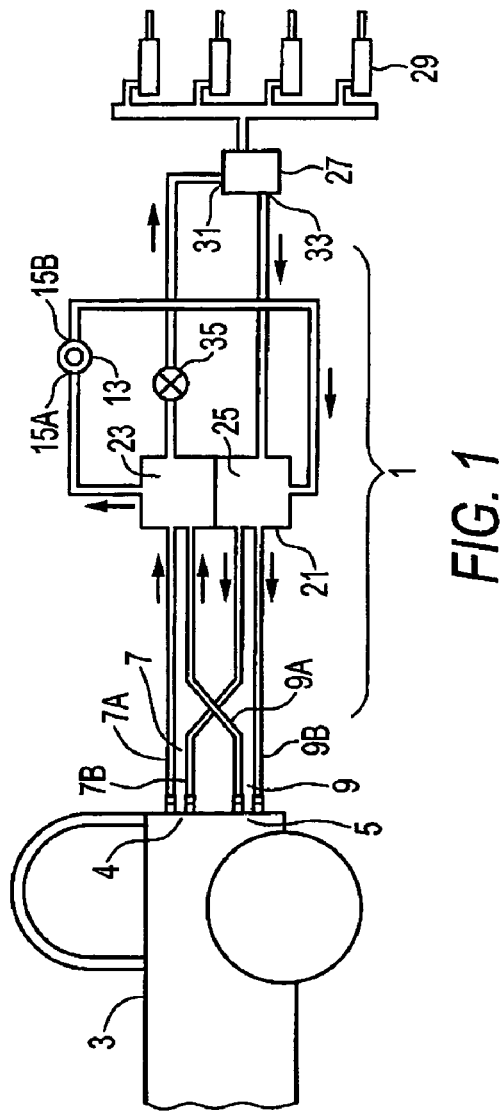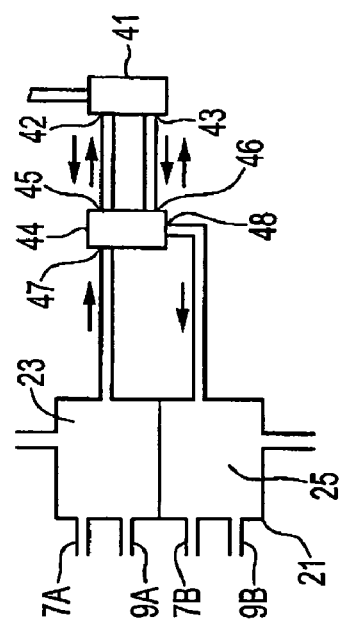

METHOD AND APPARATUS FOR DRIVING HYDRAULIC MOTORS WITH AGRICULTURAL TRACTORS

This invention is in the field of agricultural machinery, and in particular hydraulic motors on agricultural implements where a tractor is used to supply hydraulic power to drive the hydraulic motor.

BACKGROUND

In agriculture, the use of hydraulic motors is well known for use in driving various aspects of agricultural equipment, notably fans used on air seeders. The width of such air seeders has increased substantially such that implements 60 feet wide are now common. As well the amount of seed, fertilizer, and like agricultural materials that are being applied on each acre of land has increased. Significant amounts of seed and fertilizer, for example, are commonly applied at the same time by the same fan. These developments have contributed to a need for higher capacity fans, which in turn require more hydraulic power from the tractor pulling the air seeder, which tractor also typically provides the hydraulic power supply to operate the fan. Hydraulic motor driven fans on newer drills typically consume 12 to 15 gallons of fluid per minute (gal/min).

Hydraulic motors on agricultural equipment are typically connected to the tractor's hydraulic supply. A pair of hydraulic lines run from the fan, and are connected by a pair of quick couplers at the back of the tractor to a valve block. Pressurized hydraulic fluid is supplied to the valve block by a pump powered by the tractor engine. Hydraulic fluid flows out of one tractor quick coupler, through one hydraulic line to the hydraulic motor driving the fan, then back through the other hydraulic line and through the other tractor quick coupler back into the tractor hydraulic supply system. Typically a lever or the like is activated by the tractor operator to control the flow of hydraulic fluid from the tractor's hydraulic supply through the quick couplers and hydraulic lines to the hydraulic motor driving the fan. Thus the hydraulic motor, hydraulic lines, quick couplers and valve block form a hydraulic circuit through which hydraulic fluid flows under pressure to drive the fan. The operator moves the lever to cause hydraulic fluid to flow or stop flowing to turn the fan on and off.

Many original air seeders used a separate internal combustion engine to drive the fan, but the simplicity and economy of hydraulic motor drives has led to their prevalence. Obtaining sufficient fluid flow from tractors has been a problem to a greater or lesser extent since air seeders were introduced. The hydraulic pumps and valve systems on agricultural tractors provide a range of greater and lesser capacities. The pumps and valve blocks on older tractors were not designed to provide the high volumes of fluid required by air seeder fans. The size of the ports restricts fluid flow at higher rates.

Shortly after hydraulics were introduced to agricultural equipment, quick couplers were introduced for quickly and conveniently connecting hydraulic devices, primarily at that time hydraulic cylinders, to tractor hydraulic power supplies. The design of quick couplers has not changed significantly over the years partially due to the industries desire for standardization of the quick coupler. These standard quick couplers were not designed for the high flow rates required for hydraulic motors, and restrict fluid flow at higher rates.

Forcing the high flows of fluid through the restrictive ports and quick couplers causes back pressure for the fluid leaving the tractor and a second back pressure for the fluid returning to the tractor. These back pressures have several negative effects. Extra heat built up from the back pressures tax the tractor hydraulic fluid cooling system. Power is wasted as a result of the back pressures. The back pressures ultimately limit the tractors capacity to produce adequate fluid volume and pressure required by hydraulic motors, as well as other conventional implement functions such as raising and lowering, moving markers in and out, and so forth.

The back pressures result in a pressure drop between the hydraulic pump and the hydraulic line that increases significantly as fluid flow increases. The pressure drop for 15 gal/min leaving the tractor through the valve block and quick coupler is in the order of 250 to 400 pounds per square inch (psi). In addition, there is a similar pressure drop of 250 to 400 psi for fluid returning to the tractor through the quick coupler and valve block. Thus the total pressure drop of fluid leaving and returning to the tractor (not counting pressure drop at the fan) is between 500 and 800 psi on a hydraulic system with a 2100 psi operation pressure. This 500–800 psi represents a loss of 25% to 40% of the capacity.

In contrast, the pressure drop for 8 gal/min leaving the tractor is in the order of 80 to 100 psi and the same 8 gal/min returning to the tractor creates a similar back pressure of 80 to 100 psi for a total of 160–200 psi.

In order to reduce the back pressure, it is common to provide larger diameter hydraulic lines running back to the hydraulic motor driving the fan, however this does nothing to reduce the pressure drop through the quick couplers and hydraulic valve block of the single circuit, where the same 15 gal/min is required to pass.

Agricultural tractors typically have a plurality of quick coupler connections for connecting the tractor hydraulic power supply to provide controlled hydraulic fluid under pressure to the various hydraulic devices used on agricultural implements. Each set or pair of quick couplers is commonly called a "remote", as in remote connection, and hydraulic fluid flow in the hydraulic supply circuit provided by each remote is typically controlled by a lever at the operator's position. Recently it is sometimes known to provide electrical control of remotes as well, where the lever is replaced by a switch. The operation, however, is basically the same, as the operator can direct flow out a first line and back through a second, or out the second and back through the first, or shut off fluid flow altogether. Flow controls are sometimes provided as well for varying the amount of fluid flowing through a remote, in order to vary response time for a hydraulic cylinder, or the speed of a hydraulic motor.

In this way, each hydraulic function on an air seeder can be controlled substantially independently. A tractor with four remotes will typically have one connected to the fan, one to raise and lower the furrow openers, and one for raising the implement wings into a transport position. Further functions may be connected to the fourth remote, such as folding markers, another hydraulic motor driving an auger to fill the hoppers with seed and fertilizer, or the like. Air seeders are also known that use "active hydraulics" to provide biasing forces to push implement wings down to improve penetration, or to bias individual furrow openers down, much as a conventional spring would do.

These further functions typically will require much less hydraulic fluid flow than the hydraulic motor driving the fan. An active hydraulic circuit for example might only require a flow of two to five gal/min. Raising and lowering functions draw fluid only when activated.

SUMMARY OF THE INVENTION

It is an object of the present invention to provide an apparatus and method for driving a hydraulic motor with a hydraulic power supply of an agricultural tractor that overcomes problems in the prior art. It is a further object of the present invention to provide such an apparatus for connection to a hydraulic power supply of a tractor wherein the tractor comprises a plurality of hydraulic supply circuits, and wherein each hydraulic supply circuit comprises quick couplers for connecting the hydraulic supply circuit to a hydraulic device, and wherein a hydraulic motor is operatively connected to two of the hydraulic supply circuits of the tractor.

It is a further object of the present invention to provide such an apparatus that conveniently accommodates connection of further hydraulic devices.

The invention provides, in one embodiment, a hydraulic motor apparatus for connection to a hydraulic power supply of a tractor wherein the tractor comprises a plurality of hydraulic supply circuits, and wherein each hydraulic supply circuit comprises a pair of quick couplers for connecting the hydraulic supply circuit to a hydraulic device. The apparatus comprises a first pair of hydraulic lines adapted for connection to the quick couplers of a first hydraulic supply circuit; a second pair of hydraulic lines adapted for connection to the quick couplers of a second hydraulic supply circuit; and a hydraulic motor connected to both the first and second pairs of hydraulic lines such that fluid can flow from both the first and second hydraulic supply circuits through the hydraulic motor to drive the hydraulic motor.

In a second embodiment the invention provides a method of driving a hydraulic motor with a hydraulic power supply of a tractor wherein the tractor comprises a plurality of hydraulic supply circuits, and wherein each hydraulic supply circuit comprises a quick coupler for connecting a pressurized fluid output of the hydraulic supply circuit to a hydraulic device. The method comprises connecting a first hydraulic pressure line to the quick coupler of a first hydraulic supply circuit; connecting a second hydraulic line to the quick coupler of a second hydraulic supply circuit; connecting a pressure port of the hydraulic motor to both the first and second hydraulic pressure lines and connecting a return port of the hydraulic motor to a hydraulic return line connected to the hydraulic power supply of the tractor such that fluid can flow from both the first and second hydraulic supply circuits through the hydraulic motor to drive the hydraulic motor.

In a third embodiment the invention provides a hydraulic motor apparatus for connection to a hydraulic power supply of a tractor wherein the tractor comprises a plurality of hydraulic supply circuits, and wherein each hydraulic supply circuit comprises a pressure quick coupler for connecting a pressurized fluid output of the hydraulic supply circuit to a hydraulic device. The apparatus comprises a first hydraulic pressure line adapted for connection to the pressure quick coupler of a first hydraulic supply circuit; a second hydraulic pressure line adapted for connection to the pressure quick coupler of a second hydraulic supply circuit; a hydraulic motor connected to both the first and second hydraulic pressure lines, and connected to a return line that is operative to conduct hydraulic fluid from the hydraulic motor to a hydraulic reservoir on the tractor such that fluid can flow from both the first and second hydraulic supply circuits through the hydraulic motor to drive the hydraulic motor.

Conveniently the apparatus comprises a hydraulic block comprising a pressure chamber and a return chamber, wherein first and second pressure lines are connected from first and second hydraulic supply circuits to the pressure chamber, first and second return lines are connected to the return chamber, and the pressure port on the hydraulic motor is connected to the pressure chamber, and the return port on the hydraulic motor is connected to the return chamber. Further hydraulic devices can then be conveniently connected to the pressure and return chambers.

Thus the total hydraulic flow required by the hydraulic motor and any further hydraulic devices is substantially equally divided between two separate hydraulic circuits of the tractor. Instead of one hydraulic circuit supplying a flow of hydraulic fluid at or near capacity, and another supplying only a minimal flow, each hydraulic circuit supplies a more efficient intermediate flow.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic view of a hydraulic system of the invention powering a hydraulic motor and an active hydraulic circuit;

FIG. 2 is a schematic view of a hydraulic cylinder connected to the hydraulic block of FIG. 1;

DETAILED DESCRIPTION OF THE ILLUSTRATED EMBODIMENTS

Figure 3:
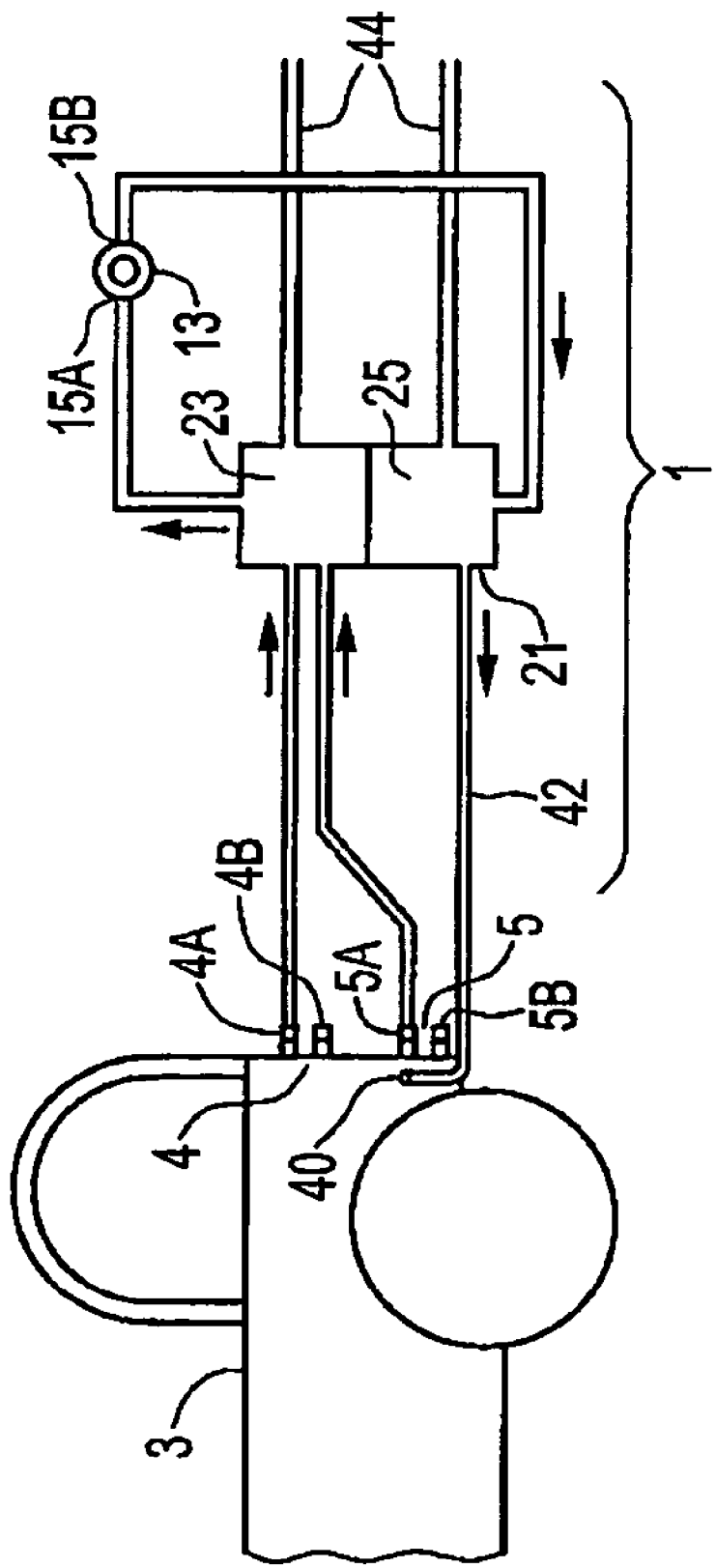
FIG. 3 is a schematic view of a hydraulic system of the invention powering a hydraulic motor wherein the return hydraulic fluid is dumped directly into the hydraulic fluid reservoir on the tractor, bypassing the return quick couplers.

FIG. 1 illustrates a hydraulic motor apparatus 1 for connection to a hydraulic power supply of a tractor 3. The illustrated tractor 3 comprises two hydraulic supply circuits, and each hydraulic supply circuit includes a pair of quick couplers 4, 5 for connecting the hydraulic supply circuit to a hydraulic device. Typically a modern tractor 3 will have three or four hydraulic circuits, each including a pair of quick couplers, but for clarity only two are illustrated.

In operation a hydraulic device, such as a hydraulic cylinder, hydraulic motor, or the like, is connected to each quick coupler on a hydraulic circuit, and a valve on the tractor is operated to direct pressurized hydraulic fluid out of one of the quick couplers, through the hydraulic device, and typically back into the tractor through the other quick coupler. The valve can direct fluid out of either quick coupler and into the other, or vice versa in order to extend or retract a hydraulic cylinder, for example.

The hydraulic motor apparatus 1 comprises a first pair of hydraulic lines 7A, 7B adapted for connection to the quick couplers 4 of the first hydraulic supply circuit. The first pair of hydraulic lines comprises a first pressure line 7A and a first return line 7B, each adapted for connection to the quick couplers 4 of the first hydraulic supply circuit as illustrated. A second pair of hydraulic lines 9A, 9B comprising a second pressure line 9A and a second return line 9B is adapted for connection to the quick couplers 5 of the second hydraulic supply circuit.

In the operation illustrated, the valves controlling the hydraulic circuits on the tractor 3 are operated such that pressurized hydraulic fluid flows out from the hydraulic supply circuits through the first and second pressure lines 7A, 9A and back into the hydraulic supply circuits through the first and second return lines 7B, 9B. Hydraulic fluid flow direction is indicated by the arrows in FIG. 1.

A hydraulic motor 13 has a pressure port 15A connected to both the first and second pressure lines 7A, 9A, and a return port 15B connected to both the first and second return lines 7B, 9B such that hydraulic fluid flows from both the first and second hydraulic supply circuits through the hydraulic motor 13 to drive the hydraulic motor 13. To facilitate connection of the hydraulic motor 13, and to provide added versatility, the illustrated embodiment includes a hydraulic block 21 comprising a pressure chamber 23 and a return chamber 25. The first and second pressure lines 7A, 9A are connected to the pressure chamber 23, and the first and second return lines 7B, 9B are connected to the return chamber 25. The pressure port 15A on the hydraulic motor 13 is connected to the pressure chamber 23, and the return port 15B on the hydraulic motor 13 is connected to the return chamber 25.

The hydraulic block 21 further facilitates connection of a second hydraulically activated device, such as an active hydraulic circuit 27 supplying a plurality of hydraulic cylinders 29 for exerting a constant downward force on a set of furrow openers, wings or the like in an air seeder. The active hydraulic circuit 27 has first and second ports 31, 33 adapted for attachment to a hydraulic supply circuit. The first port 31 is connected to both the first and second pressure lines 7A, 9A through the pressure chamber 23, and the second port 33 is connected to both the first and second return lines 7B, 9B through the return chamber 25. In operation a continuous flow of hydraulic fluid passes through the active hydraulic circuit 27, and a remote controlled valve 35 is operative to block the flow of hydraulic fluid through the active hydraulic circuit 27 as desired.

Conventionally such active hydraulic circuits 27 are connected directly to one of the hydraulic supply circuits on the tractor 3 through one set of quick couplers, and typically draw only two to five gal/min, substantially less than the capacity of the hydraulic supply circuit. Thus in a conventional hydraulic system for an air seeder, the fan hydraulic motor draws the maximum output of about 15 gal/min from one hydraulic supply circuit of the tractor 3 creating substantial back pressure at the quick couplers and reducing efficiency. At the same time an active hydraulic circuit for exerting a constant downward force on a set of furrow openers, wings or the like will draw much less than the available capacity. Using the system of the present invention, two hydraulic supply circuits are connected together to supply both the fan hydraulic motor and the active hydraulic circuit. Thus for a fan hydraulic motor drawing 15 gal/min and an active hydraulic circuit drawing 3 gal/min, the flow through each set of quick couplers is only one half of the total draw, or 9 gal/min. Back pressure is significantly reduced, and efficiency is increased.

Similarly the second hydraulically activated device could comprise a second hydraulic motor.

FIG. 2 illustrates a hydraulic block 21 with pressure and return chambers 23, 25 connected to control a hydraulic cylinder 41 having first and second ports 42, 43 adapted for attachment to a hydraulic supply circuit. A valve 44 having a pair of device ports 45, 46 operatively connected to the first and second ports 42, 43, and a pair of power ports 47, 48. One power port 47 is connected to both the first and second pressure lines 7A, 9A through pressure chamber 23, and the other power port 48 is connected to both the first and second return lines 7B, 9B through the return chamber 25. The valve 44 is operative in a first mode of operation to direct hydraulic fluid from the first and second pressure lines 7A, 9A to the first port 42, and is operative in a second mode of operation to direct hydraulic fluid from the first and second pressure lines 7A, 9A to the second port 43. Thus the valve 44 can control extension and retraction of the hydraulic cylinder 41. Similarly the hydraulic cylinder 41 could be replaced with a hydraulic motor, and the valve 44 could control the direction of rotation of the hydraulic motor.

The invention thus provides, as schematically illustrated in FIG. 3, a method of driving a hydraulic motor 13 with a hydraulic power supply of a tractor 3. The tractor 3 has two hydraulic supply circuits, each comprising a pair of quick couplers 4, 5 for connecting the hydraulic supply circuit to a hydraulic device. In the illustrated embodiment of FIG. 3, only the output quick couplers 4A, and 5A are connected, thereby connecting the pressurized fluid output of the hydraulic supply circuit to the hydraulic motor apparatus 1. In some tractors a dump port 40 is provided that allows the return fluid from the hydraulic motor apparatus to be dumped directly into the hydraulic fluid reservoir of the tractor. The return fluid thus bypasses the return quick couplers 4B, 5B reducing back pressure caused by the quick couplers. The operation of the embodiment illustrated in FIG. 3 is otherwise the same as that of FIG. 1.

The method comprises connecting the first and second hydraulic pressure lines 7A, 9A to the corresponding output quick couplers 4A, 5A of first and second hydraulic supply circuits; then connecting the pressure port 15A of the hydraulic motor 13 to both the first and second hydraulic pressure lines 7A, 9A and connecting the return port 15B of the hydraulic motor 13 to a hydraulic return line 42 connected to the hydraulic power supply of the tractor 3 through the dump port 40. In the illustrated embodiment this is accomplished by connecting both pressure lines to a pressure chamber 23 in a hydraulic block 21 and connecting the pressure chamber 23 to the pressure port 15A. Similarly the return port 15B is connected to return chamber 25 in the hydraulic block 21, and return line 42 is also connected to the return chamber 25. Thus hydraulic fluid can flow from both the first and second hydraulic supply circuits through the hydraulic motor 13 to drive the hydraulic motor 13.

Conveniently the connection is made as illustrated through the hydraulic block 21. Further hydraulic devices can then be conveniently connected through the hydraulic block as well through lines 44 with appropriate control valves and the like.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A hydraulic motor apparatus for connection to a hydraulic power supply of a tractor wherein the tractor comprises a plurality of hydraulic supply circuits, and wherein each hydraulic supply circuit comprises a pair of quick couplers for connecting the hydraulic supply circuit to a hydraulic device, the apparatus comprising:

a first pair of hydraulic lines adapted for connection to the quick couplers of a first hydraulic supply circuit;

a second pair of hydraulic lines adapted for connection to the quick couplers of a second hydraulic supply circuit;

a hydraulic motor connected to both the first and second pairs of hydraulic lines such that fluid can flow from both the first and second hydraulic supply circuits through the hydraulic motor to drive the hydraulic motor.

2. The apparatus of claim 1 wherein:

the first pair of hydraulic lines comprises a first pressure line and a first return line adapted for connection to the quick couplers of the first hydraulic supply circuit such that hydraulic fluid can flow out from the first hydraulic supply circuit through the first pressure line and back into the first hydraulic supply circuit through the first return line;

the second pair of hydraulic lines comprises a second pressure line and a second return line adapted for connection to the quick couplers of the second hydraulic supply circuit such that hydraulic fluid can flow out from the second hydraulic supply circuit through the second pressure line and back into the second hydraulic supply circuit through the second return line; and the hydraulic motor has a pressure port connected to both the first and second pressure lines, and a return port connected to both the first and second return lines.

3. The apparatus of claim 2 further comprising a second hydraulically activated device having first and second ports for attachment to a hydraulic supply circuit, and wherein the first port is connected to both the first and second pressure lines, and the second port is connected to both the first and second return lines.

4. The apparatus of claim 3 wherein the second hydraulically activated device comprises an active hydraulic circuit.

5. The apparatus of claim 4 where in operation a substantially continuous flow of hydraulic fluid passes through the active hydraulic circuit.

6. The apparatus of claim 4 where in operation hydraulic fluid passes through the active hydraulic circuit on demand.

7. The apparatus of claim 2 further comprising a hydraulic block comprising a pressure chamber and a return chamber, and wherein the first and second pressure lines are connected to the pressure chamber, the first and second return lines are connected to the return chamber, the pressure port on the hydraulic motor is connected to the pressure chamber, and the return port on the hydraulic motor is connected to the return chamber.

8. The apparatus of claim 7 further comprising a second hydraulically activated device having a first port connected to the pressure chamber and a second port connected to the return chamber.

9. The apparatus of claim 8 wherein the second hydraulically activated device comprises a second hydraulic motor.

10. The apparatus of claim 8 wherein the second hydraulically activated device comprises a hydraulic cylinder.

11. The apparatus of claim 8 wherein the second hydraulically activated device comprises an active hydraulic circuit where in operation a substantially continuous flow of hydraulic fluid passes through the active hydraulic circuit.

12. The apparatus of claim 11 further comprising a remote-controlled valve operative to block the flow of hydraulic fluid through the active hydraulic circuit.

13. The apparatus of claim 2 further comprising:

a second hydraulically activated device having first and second ports for attachment to a hydraulic supply circuit;

a valve apparatus having a pair of device ports operatively connected to the first and second ports, and a pair of power ports; and wherein one of the power ports is connected to both the first and second pressure lines, and the other of the power ports is connected to both the first and second return lines.

14. The apparatus of claim 13 wherein the second hydraulically activated device comprises a hydraulic cylinder.

15. The apparatus of claim 13 wherein the second hydraulically activated device comprises a second hydraulic motor.

16. The apparatus of claim 13 wherein the valve apparatus is operative in a first mode of operation to direct hydraulic fluid from the first and second pressure lines to the first port, and is operative in a second mode of operation to direct hydraulic fluid from the first and second pressure lines to the second port.

17. A method of driving a hydraulic motor with a hydraulic power supply of a tractor wherein the tractor comprises a plurality of hydraulic supply circuits, and wherein each hydraulic supply circuit comprises a quick coupler for connecting a pressurized fluid output of the hydraulic supply circuit to a hydraulic device, the method comprising:

connecting a first hydraulic pressure line to the quick coupler of a first hydraulic supply circuit;

connecting a second hydraulic line to the quick coupler of a second hydraulic supply circuit;

connecting a pressure port of the hydraulic motor to both the first and second hydraulic pressure lines and connecting a return port of the hydraulic motor to a hydraulic return line connected to the hydraulic power supply of the tractor such that fluid can flow from both the first and second hydraulic supply circuits through the hydraulic motor to drive the hydraulic motor.

18. The method of claim 17 further comprising connecting a second hydraulically activated device to both the first and second hydraulic pressure lines such that fluid can flow from both the first and second hydraulic supply circuits to the second hydraulically activated device.

19. The method of claim 18 further comprising providing a valve to control the flow of fluid to the second hydraulically activated device.

20. The method of claim 18 wherein the second hydraulically activated device comprises an active hydraulic circuit connected to both the first and second hydraulic pressure lines and the hydraulic return line such that fluid can flow from both the first and second hydraulic supply circuits through the active hydraulic circuit.

21. The method of claim 20 further comprising providing a remote-controlled valve operative to block the flow of hydraulic fluid through the active hydraulic circuit.

22. A hydraulic motor apparatus for connection to a hydraulic power supply of a tractor wherein the tractor comprises a plurality of hydraulic supply circuits, and wherein each hydraulic supply circuit comprises a pressure quick coupler for connecting a pressurized fluid output of the hydraulic supply circuit to a hydraulic device, the apparatus comprising:

a first hydraulic pressure line adapted for connection to the pressure quick coupler of a first hydraulic supply circuit;

a second hydraulic pressure line adapted for connection to the pressure quick coupler of a second hydraulic supply circuit;

a hydraulic motor connected to both the first and second hydraulic pressure lines, and connected to a return line that is operative to conduct hydraulic fluid from the hydraulic motor to a hydraulic reservoir on the tractor such that fluid can flow from both the first and second hydraulic supply circuits through the hydraulic motor to drive the hydraulic motor.

23. The apparatus of claim 22 wherein the return line is connected to the hydraulic reservoir through a dump port.

* * * * *